(12) United States Patent
Mani et al.

(10) Patent No.: US 8,020,005 B2
(45) Date of Patent: Sep. 13, 2011

(54) METHOD AND APPARATUS FOR MULTI-MODEL HYBRID COMPARISON SYSTEM

(75) Inventors: Seshadri Mani, Surrey (CA); David M. D'Andrea, Issaquah, WA (US)

(73) Assignee: Scout Analytics, Inc., Issaquah, WA (US)

( * ) Notice: Subject to any disclaimer, the term of this patent is extended or adjusted under 35 U.S.C. 154(b) by 1455 days.

(21) Appl. No.: 11/317,685

(22) Filed: Dec. 23, 2005

(65) Prior Publication Data

US 2007/0150747 A1   Jun. 28, 2007

(51) Int. Cl.
G06F 21/00 (2006.01)
(52) U.S. Cl. ........................................ 713/182; 713/186
(58) Field of Classification Search .................. 713/186, 713/182; 382/115; 340/5.82, 5.52
See application file for complete search history.

(56) References Cited

U.S. PATENT DOCUMENTS

| | | | |
|---|---|---|---|
| 3,993,976 A | 11/1976 | Ginsburg | |
| 4,197,524 A | 4/1980 | Salem | |
| 4,455,588 A | 6/1984 | Mochida et al. | |
| 4,499,462 A | 2/1985 | Stoesser et al. | |
| 4,621,334 A | 11/1986 | Garcia | |
| 4,805,222 A | 2/1989 | Young et al. | |
| 5,060,263 A | 10/1991 | Bosen et al. | |
| 5,161,245 A | 11/1992 | Fenwick | |
| 5,181,238 A | 1/1993 | Medamana et al. | |
| 5,222,195 A | 6/1993 | Alkon et al. | |
| 5,276,769 A | 1/1994 | Ueda et al. | |
| 5,371,809 A | 12/1994 | Desieno | |
| 5,544,255 A | 8/1996 | Smithies et al. | |
| 5,557,686 A | 9/1996 | Brown et al. | |
| 5,675,497 A | 10/1997 | Petsche et al. | |
| 5,764,889 A | 6/1998 | Ault et al. | |
| 5,793,952 A | 8/1998 | Limsico | |
| 5,802,507 A | 9/1998 | Gentric et al. | |
| 5,910,989 A | 6/1999 | Naccache | |
| 5,930,804 A | 7/1999 | Yu et al. | |
| 6,062,474 A | 5/2000 | Kroll | |
| 6,070,159 A | 5/2000 | Wilson et al. | |
| 6,151,593 A | 11/2000 | Cho et al. | |
| 6,167,439 A | 12/2000 | Levine et al. | |
| 6,272,479 B1 | 8/2001 | Farry et al. | |
| 6,307,955 B1 | 10/2001 | Zank et al. | |

(Continued)

FOREIGN PATENT DOCUMENTS

EP   1 251 468 A2   10/2002

(Continued)

OTHER PUBLICATIONS

PCT International Search Report (dated Jun. 5, 2006), International Application No. PCT/US2006/048964—International Filing Date Dec. 20, 2006 (14 pages).

(Continued)

*Primary Examiner* — Edward Zee
*Assistant Examiner* — Chi Nguy
(74) *Attorney, Agent, or Firm* — Blakely Sokoloff Taylor & Zafman LLP

(57) ABSTRACT

A user authentication system collects measurements of physical and/or behavioral characteristics of a user. The measurements are processed by two or more processing engines to produce initial confidence measures, and a unified confidence measure is prepared from weighted inputs including the initial confidence measures.

21 Claims, 6 Drawing Sheets

U.S. PATENT DOCUMENTS

| | | | |
|---|---|---|---|
| 6,334,121 | B1 | 12/2001 | Primeaux et al. |
| 6,405,922 | B1 | 6/2002 | Kroll |
| 6,421,450 | B2 | 7/2002 | Nakano |
| 6,513,018 | B1 | 1/2003 | Culhane |
| 6,597,775 | B2 | 7/2003 | Lawyer et al. |
| 6,839,682 | B1 | 1/2005 | Blume et al. |
| 6,850,606 | B2 | 2/2005 | Lawyer et al. |
| 6,865,566 | B2 | 3/2005 | Serrano-Morales et al. |
| 6,903,723 | B1 | 6/2005 | Forest |
| 6,944,604 | B1 | 9/2005 | Majoor |
| 6,965,889 | B2 | 11/2005 | Serrano-Morales et al. |
| 6,968,328 | B1 | 11/2005 | Kintzer et al. |
| 6,993,514 | B2 | 1/2006 | Majoor |
| 7,246,243 | B2 | 7/2007 | Uchida |
| 2001/0036297 | A1 | 11/2001 | Ikegami et al. |
| 2002/0171603 | A1 | 11/2002 | Chen et al. |
| 2004/0005995 | A1 | 1/2004 | Edelson |
| 2004/0034788 | A1 | 2/2004 | Ross |
| 2004/0103296 | A1 | 5/2004 | Harp et al. |
| 2004/0162999 | A1 | 8/2004 | Schreiber et al. |
| 2004/0187037 | A1 | 9/2004 | Checco |
| 2005/0008148 | A1 | 1/2005 | Jacobson |
| 2005/0058324 | A1 | 3/2005 | Karhik |
| 2005/0149463 | A1 | 7/2005 | Bolt et al. |
| 2006/0016871 | A1 | 1/2006 | Bonalle et al. |
| 2006/0136744 | A1* | 6/2006 | Lange ............................ 713/186 |
| 2006/0222210 | A1* | 10/2006 | Sundaram ..................... 382/115 |
| 2007/0009140 | A1 | 1/2007 | Jitsui et al. |
| 2007/0245151 | A1* | 10/2007 | Phoha et al. .................. 713/186 |

FOREIGN PATENT DOCUMENTS

| | | |
|---|---|---|
| JP | 11 253426 | 9/1999 |
| JP | 11 306351 | 11/1999 |
| JP | 2004013831 A | 1/2004 |

OTHER PUBLICATIONS

Cotton, Ira W. et al, "Approaches to Controlling Personal Access to Computer Terminals," *Proceeding Computer Networks: Treads & Appos.*, 1975.

Fielding, R., et al., "Hypertext Transfer Protocol—HTTP 1.1", RFC2616 dated Jun. 1999; 177 pages.

"Guidelines on Evaluation of Techniques for Automated Personal ID," U.S. Dept. of Comm./NBS, FIPS, PUB 48, Apr. 1977.

"Keystroke Dynamics Authentication of Computer Terminal Users," Bioaccess System 2000, 2000A, 2001, 2011, and OEM, Jun. 1984.

Kullback, Solomon, *Information Theory & Statistics*, John Wiley & Sons Inc., pp. 3383, 1959.

Rennick, R.J. et al., "Mufti-A Multi-Function ID System," *WESCON Tech. Papers*, 1975.

Riganati, John P., "An Overview of Electronic ID Systems," *WESCON Tech. Papers*, 1975.

Saltzer, Jerome H. et al., "The Protection of Information in Computer System," *Proceedings of the IEEE*, vol. 63, No. 9, Sep. 1975 (pp. 1278-1308).

Sedgwick, John, "The Body Code Machines: These New Computerized Devices Can Recognize You Anywhere," *This World*, Jan. 9, 1983, pp. 9-10.

Biopassword, "Technical Report. BioPassword Keystroke Dynamics", http://web.archive.org/web/20040807231; http://www.biopassword.com/home/technology/BP%204.5%20Technical%20Paper.pdf, (Oct. 18, 2001).

Ilonen, J, "Keystroke dynamics", Advanced topics in information processing 1—lectures, Lappeenranta University of Technology, Department of Information Technology, (2003), 1-15.

Monrose, F, et al., "Keystroke dynamics as a biometric for authentication", Future Generation Computer Systems, vol. 16, (2000), 351-359.

Peacock, A , et al., "Typing patterns: a key to user identification", IEEE Computer Society, vol. 2, No. 5, (Sep. 2004), 40-47.

Penn State Research Foundation, Inc. , EP Extended Search Report dated Oct. 1, 2008 for EP Application No. 05858188.5.

BioPassword Technical Report, BioPassword Keystroke Dynamics, Oct. 2001, pp. 1-9.

Bleha, S., et al., "Computer-Access Security Systems Using Keystroke Dynamics," IEEE Transactions on Pattern Analysis and Machine Intelligence (Dec. 1990), 12(12): 1217-1222.

Brown, M., et al., "User Identification via Keystroke Characteristics of Typed Names Using Neural Networks," Int. Journal of Man-Machine Studies (1993) 39(6): 99-1014.

Gaines, R.S., et al., "Authentication by Keystroke Timing: Some Preliminary Results," Rand Report R-256-NSF, Rand Corporation, 1980.

Jain, A.K., et al., "Aritificial Nerual Networks: A Tutorial," Computer, (Mar. 1996) 29(3): 31-44.

Legett, J., et al., "Verifying identity via keystroke characteristics," Int. Journal of Man-Machine Studies (1988) 28(1): 67-76.

Lippmann, R.P., et al., "An Introduction to Computing with Neural Nets," IEEE ASSP Magazine, (Apr. 1987) 4(2): 4-22.

Monrose, F., et al., "Authentication via Keystroke Dynamics," Proc. of the ACM Workshop, ACM Conference on Computer Communications Security (1997), pp. 48-56.

Monrose, F., et al., "Keystroke dynamics as a biometric for authentication," Future Generation Computer Systems, 16(2000): 359-359, Mar. 1999.

Robinson, J.A., et al., "Computer User Verification Using Login String Keystroke Dynamics," IEEE Transactions on Systems, Man and Cybernetic—Part A: Systems and Humans, (Mar. 1998) vol. 28, No. 2, pp. 236-241.

Sheng, Y., et al., "A parallel decision tree-based method for user authentication based on keystroke patterns," IEEE Transactions on Systems, Man and Cybernetics—Part B: Cybernetics, (Aug. 2005) 35(4): 836-833.

Umphress, D., et al., "Identity Verification Through Keyboard Characteristics," Int. Journal of Man-Machine Studies (1985) 23(3): 263-273.

Admitone Security, Inc., Non final office action dated Jun. 2, 2009 for U.S. Appl. No. 11/396,786.

Admitone Security, Inc., Final Office Action dated Jul. 14, 2009 for U.S. Appl. No. 11/349,814.

Admitone Security, Inc., Non final office action dated Aug. 6, 2009 for U.S. Appl. No. 11/426,568.

Penn State Research Foundation, Final Office Action dated May 11, 2009 for U.S. Appl. No. 11/241,103.

* cited by examiner

METHOD AND APPARATUS FOR MULTI-MODEL HYBRID COMPARISON SYSTEM

FIELD

Authenticating users of a computing system.

BACKGROUND

Computer systems often contain valuable and/or sensitive information, control access to such information, or play an integral role in securing physical locations and assets. The security of information, assets and locations is only as good as the weakest link in the security chain, so it is important that computers reliably be able to distinguish authorized personnel from impostors. In the past, computer security has largely depended on secret passwords. Unfortunately, users often choose passwords that are easy to guess or that are simple enough to determine via exhaustive search or other means. When passwords of greater complexity are assigned, users may find them hard to remember, so may write them down, thus creating a new, different security vulnerability.

Various approaches have been tried to improve the security of computer systems. For example, in "have something, know something" schemes, a prospective user must know a password (or other secret code) and have (or prove possession of) a physical token such as a key or an identification card. Such schemes usually provide better authentication than passwords alone, but an authorized user can still permit an unauthorized user to use the system simply by giving the token and the secret code to the unauthorized user.

Other authentication methods rely on unique physical characteristics of users to identify authorized users. For example, fingerprints, voice patterns and retinal images have all been used with some success. However, these methods usually require special hardware to implement (e.g. fingerprint or retinal cameras; audio input facilities).

A computer authentication technique that is more secure than simple passwords, more difficult to subvert than token systems, and does not require special hardware facilities may be of value in this field.

SUMMARY

A plurality of physical and/or behavioral measurements of a prospective computer user are made, and data derived from those measurements is analyzed by two or more processing engines. A typical processing engine implements a unique single algorithm technique. For example, a system that uses a statistical technique and a neural technique would be considered a two-engine system. Each analysis yields a confidence measure that the prospective user is who the user claims to be. The at least two confidence measures are weighted and then combined into a unified confidence measure. The unified confidence measure could be used in a number of ways including, but not limited to, restricting access to the computer or a resource controlled by the computer, triggering a security alert, or performing user profiling.

BRIEF DESCRIPTION OF DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments measure physical and/or behavioral characteristics associated with a prospective user of a computer system, then analyze data derived from those measurements through two or more processing engines. Finally, the outputs of the engines are consolidated to produce a unified confidence measure, indicating how likely it is that the prospective user is who the user claims to be.

Figure 1:
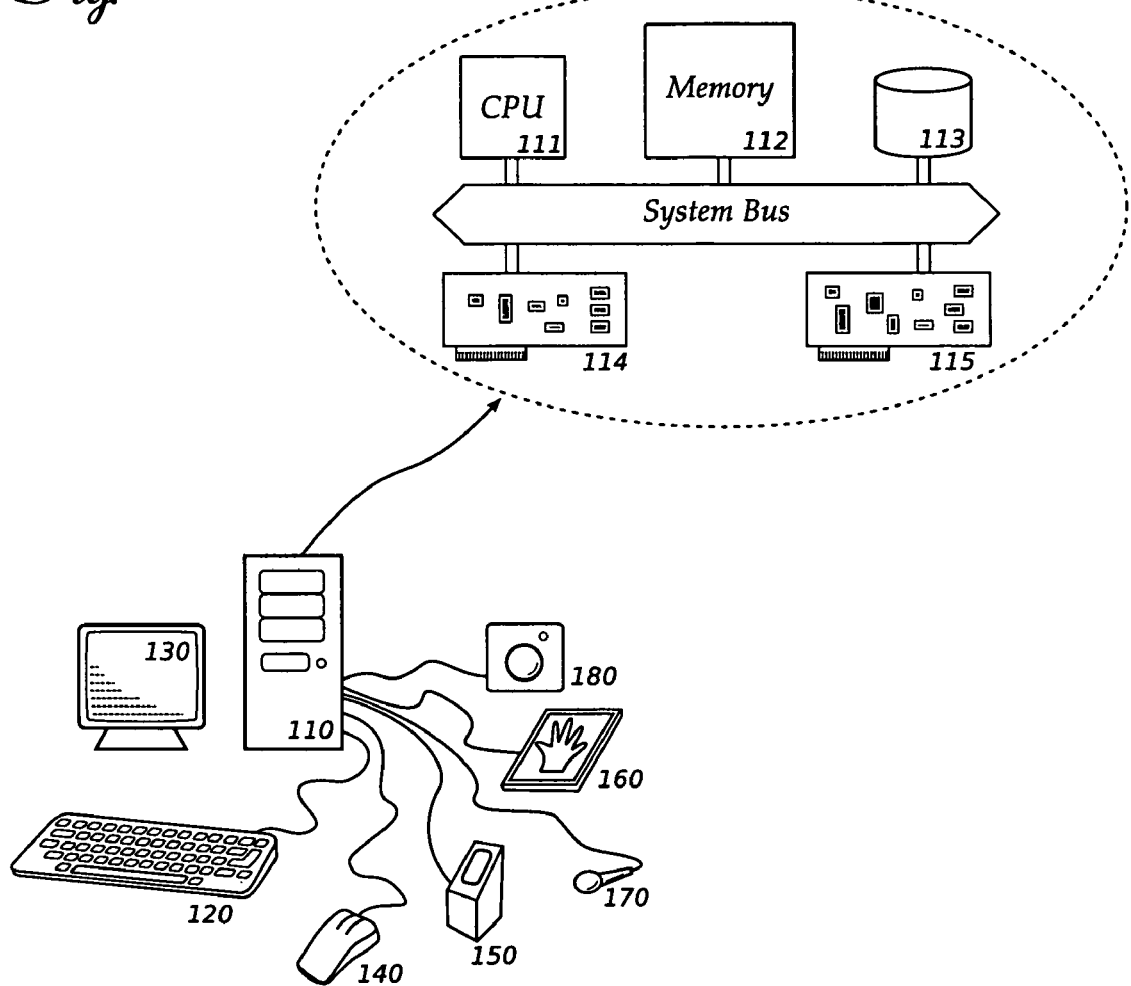
FIG. 1 shows a computer system including a number of input devices that can be used with an embodiment of the invention.

FIG. 1 shows a computer system that can implement an embodiment of the invention. The system comprises main unit 110, keyboard 120 and display device 130. Embodiments may be able to use auxiliary input devices such as mouse 140, fingerprint reader 150, hand geometry measurement device 160, microphone 170 or camera 180, but a minimum embodiment does not require any hardware beyond main unit 110 and keyboard 120. Even display 130 may be omitted or replaced by a simpler unit that can communicate only a few different messages or commands.

Main unit 110 may be a general-purpose computer, including elements commonly found in such a device: central processing unit ("CPU") 111, memory 112, mass storage device 113, communication interface 114, and input/output ("I/O") facilities 115. Alternatively, a special-purpose machine can be constructed with hardware, firmware and software modules to perform the operations described below.

Figure 2:
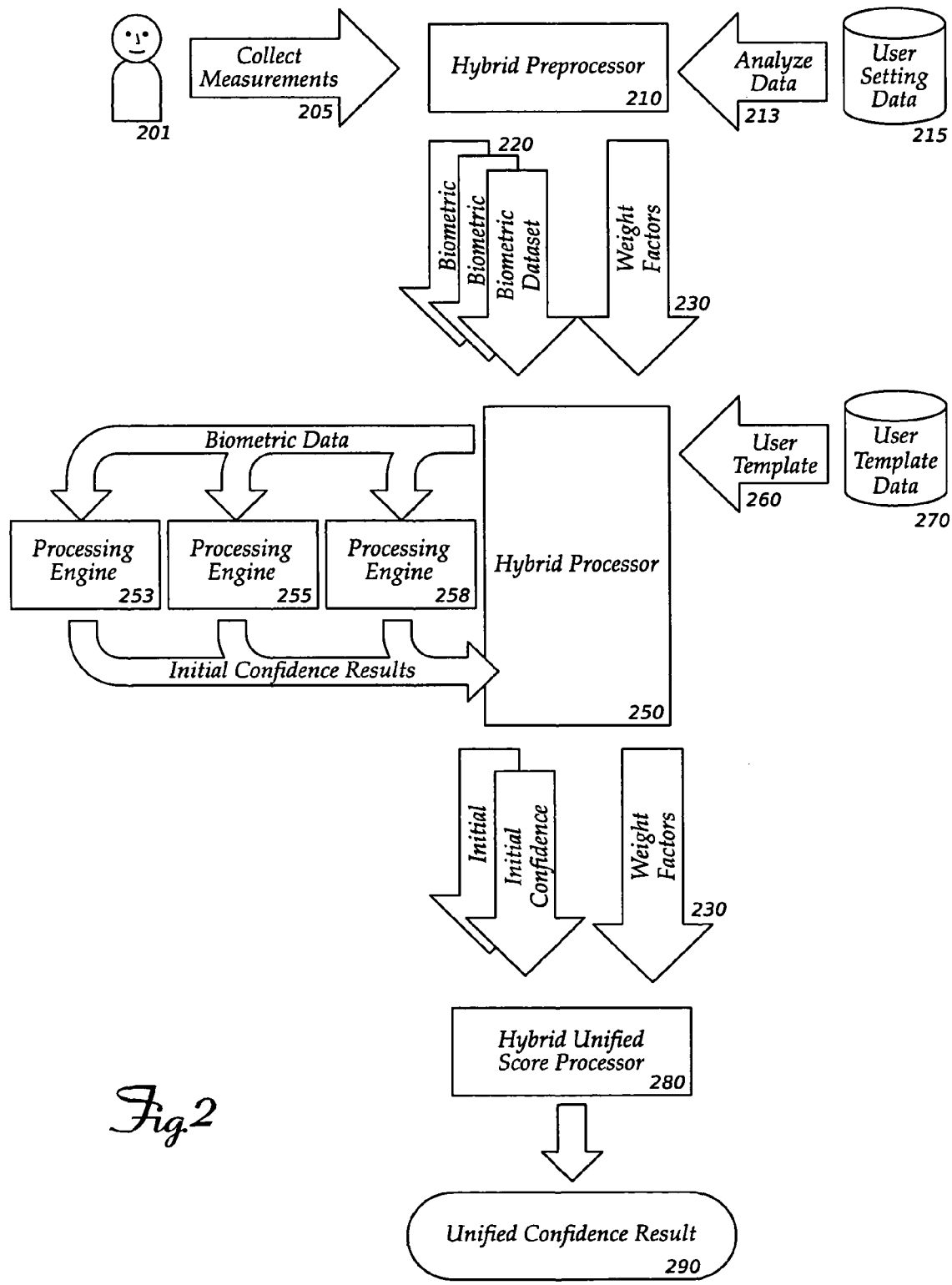
FIG. 2 is a block diagram of elements and steps involved in a hybrid comparison system.

Embodiments can authenticate a prospective user—verify that the user is who the user claims to be—by operating generally according to the architectural chart shown in FIG. 2. First, hybrid preprocessor 210 collects a plurality of measurements 205 of physical and/or behavioral characteristics of prospective user 201, and performs a preliminary analysis 213 of user settings data 215. In some embodiments, hybrid preprocessor 210 may incorporate other factors, such as historical data concerning the user and/or the performance of an individual processing engine, the maturity of template data provided to the engine, or the type or complexity of the measurements. The hybrid preprocessor 210 forwards biometric input datasets 220 and weight factors 230 for multiple engines to hybrid processor 250.

Hybrid processor 250 obtains appropriate biometric template data 260 for each of the processing engines 253, 255, 258 from a user template database 270, and provides the input and template data sets to each engine. The output of each engine 253, 255, 258 is an initial confidence measure that, based on the input and template data and according to the algorithm or method of the engine, the prospective user is the same as the user described by the template data.

Finally, hybrid unified score processor 280 receives the outputs of the engines and weights them according to weight factors 230 from hybrid preprocessor 210. The output of hybrid unified score processor 280 is unified confidence measure 290 prepared from the weighted confidence measures of processing engines 253, 255 and 258.

Regarding the measurements collected by hybrid preprocessor 210, these may include any physical and/or behavioral characteristics of the prospective user 201. These measurements will be referred to generally as "biometric measurements." For example, they may include physical biometric measurements such as images of the prospective user's fingerprints, irises or retinas, finger length measurements, digitized voice impressions, etc. They may also include behavioral biometric measurements such as rates, rhythms, and characteristic patterns seen when the user types or interacts with other input devices. One simple embodiment may collect and analyze typing inputs of a user without additional inconvenience to the user and without special hardware.

Figure 3:
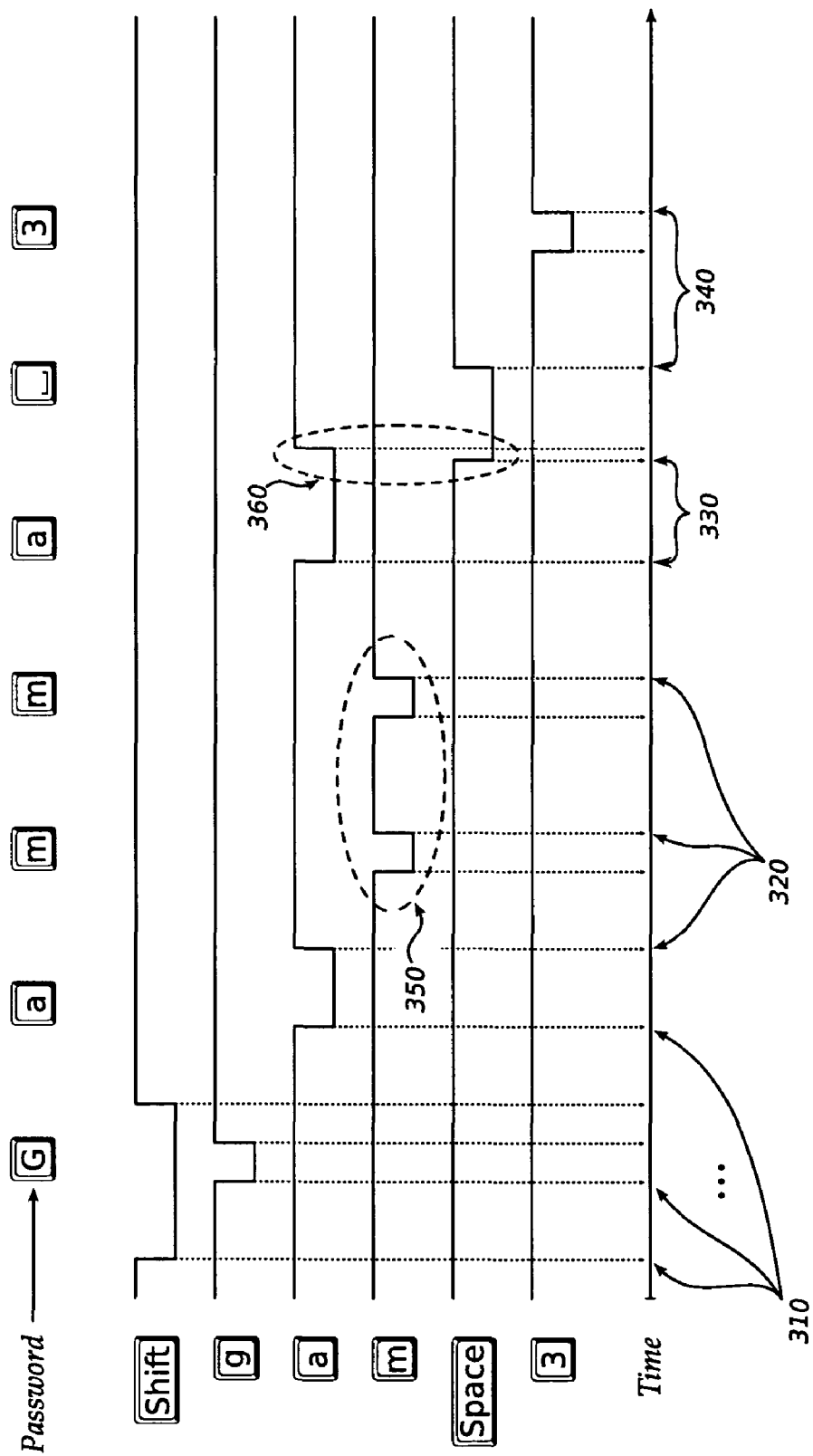
FIG. 3 shows keystroke timing relationships that may be captured and processed by an embodiment of the invention.

FIG. 3 shows some features of a keyboard entry that can be measured and processed through one or more processing engines to help authenticate a user. The string being entered is "Gamma 3", a relatively weak password. However, the relative timings of the key presses and key releases involved in typing the string can encode additional information that may be of use in identifying the typist. Hybrid preprocessor 210 (FIG. 2) may collect the time of each key press 310 and key release 320, as well as the identity of the keys pressed. From this raw data, several different data sets can be prepared. For example, the string "Gamma 3" itself can be extracted, and a simple processing engine could compare the string with a password stored in a user template database. If the password is wrong, the simple processing engine (for example, processing engine 253 in FIG. 2) would produce a "not authenticated" result. Alternatively, lexical analysis of the password (i.e. checking to see that the user typed the correct password) may be done in a preliminary validation phase, since there may be no point in examining the biometric data associated with an incorrect password.

A second processing engine (for example, processing engine 255 in FIG. 2) might examine the timings of successive key presses 330 and key releases 340 and compare those timings with a typing sample in the template database. The comparison may involve a statistical analysis and identify features of keystroke timing measurements for each character.

A third processing engine (for example, processing engine 258 in FIG. 2) might be implemented as a neural network that is trained on several samples to recognize typing patterns of the user. The neural network can use that training to analyze the typing of the prospective user during the comparison process. A neural network might extract more subtle identification cues from the collected data. For example, it might "learn" that the user types repeated letters in a distinctive way (350) or that he or she sometimes overlaps successive keystrokes (presses a second key before releasing the first key, as shown at 360). (Describing a neural network as having "learned" something anthropomorphizes what actually happens in a neural network. However, this expression is a common way of describing a result of the training process. In the neural-network vernacular, the operations of a neural network to identify a user based on a biometric data sample are expressed as "classifying the input data.")

It is appreciated that the strings a user types to provide raw biometric data need not be secret. A user can be identified by the way the user types his/her own name, his/her email address, or a common phrase, and not only by the way he/she types a password. Furthermore, users often become proficient (and therefore consistent) at typing these other strings, so confidence in an identification based on a typing pattern may increase over time.

Some embodiments may use the results of a first authentication to adjust weights, parameters and templates for use in subsequent authentications. For example, an authentication based on a typing pattern of a newly-learned password or sample phrase might provide a low level of confidence, but as the user continues to type the password or phrase, the system can learn the features of the typing pattern that reliably distinguish the user from an impostor.

Figure 4:
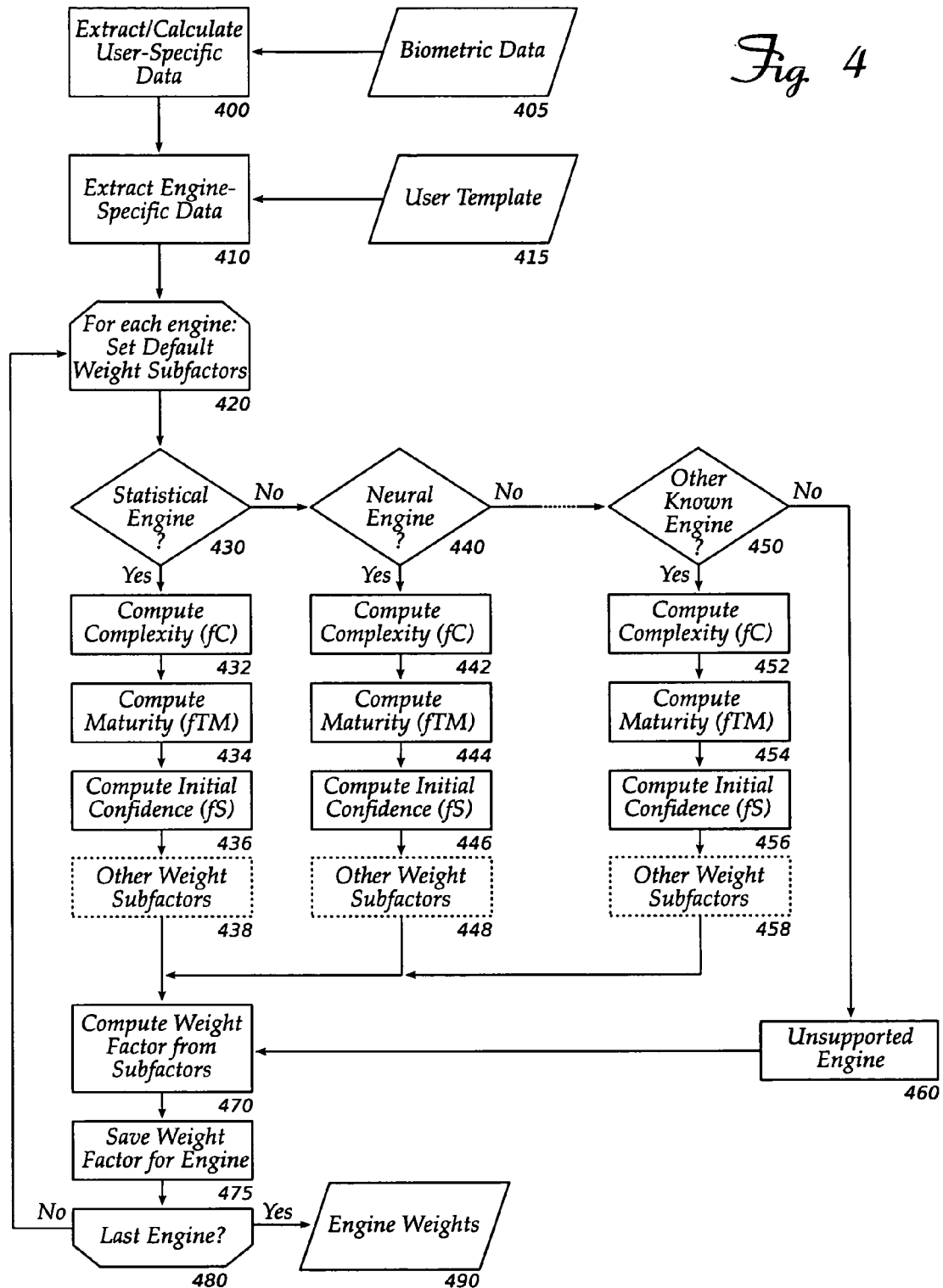
FIG. 4 is a flow chart showing operations of a hybrid preprocessor.

FIG. 4 is a detailed flowchart showing the operations of a hybrid preprocessor according to an embodiment. It shows the process flow of an embodiment with a plurality of processing engines utilizing behavioral biometric measurements (here, keystroke inputs) and would involve the following operations within this hybrid system. First, keystroke data is collected while the prospective user enters his name, password or other information (405). The data is analyzed to extract secondary measures such as the string complexity, familiarity, and artifacts related to the input device (400).

Next, engine-specific data is extracted (410) from a user template (415) from user template database 270. This data may include information such as initial confidence results and maturity of template data. The embodiment iterates over the processing engines (420) to prepare weight subfactors related to several aspects of the data. Each engine may use different weight subfactors for various aspects. For example, if the engine is a statistical engine (430), the complexity subfactor fC (432) is calculated based on the methodology described below under String Complexity. Other subfactors, such as fTM (template maturity, 434) and fS (initial confidence, 436), may also be set (The template maturity and initial confidence subfactors are also described below.) Other weight subfactors (438, 448, 458) may be calculated for some or all engines. Although not described in detail, weight subfactors that encode information about the user's familiarity with the string or known artifacts associated with a particular input device, among others, may permit a processing engine's behavior to be tuned or improved.

For a neural engine (440), different weight subfactor values may be appropriate (442-448), and other engines may use yet other subfactors (450-458). An embodiment may permit processing engines to be added on the fly as plug-in or loadable modules, but if some of the appropriate weight subfactors for an engine are unknown to the hybrid preprocessor, it may simply exclude those subfactors while calculating the weighted initial confidence result (460).

When all the weight subfactors for an engine have been prepared, an engine weight may be computed from them (470) and saved with the weight factors computed for other processing engines (475). The preprocessor continues to iterate over the remaining engines (480). When each engine has been processed, a set of engine weights 490 has been prepared.

Further details of several weight subfactors that may be of interest to developers implementing an embodiment of the invention are given below.

Weight Subfactor fC: String Complexity fC is a weighting subfactor related to the complexity of a string. The longer the string and the larger the number of different letters used, the greater its complexity. Repeated letters and repeated sequences reduce a string's complexity. For example, "pppp" has low complexity, while "Hauptbahnhof" has high complexity. In some embodiments, only a limited number of complexity levels (e.g. high, medium and low) need be distinguished.

fC depends on both the raw complexity of a string and an engine's accuracy in connection with strings of that complexity. For example, engines could be tested in a controlled environment with strings of varying complexity to give these results:

TABLE 1

| Complexity Levels | Engine A | | Engine B | | Engine C | |
|---|---|---|---|---|---|---|
| | Accuracy | fC | Accuracy | fC | Accuracy | fC |
| 1 | 16/20 | 16.0 | 10/20 | 10.0 | 19/20 | 19.0 |
| 2 | 17/20 | 17.0 | 10/20 | 10.0 | 10/20 | 10.0 |
| ... | | | | | | |
| n | 19/20 | 19.0 | 10/20 | 10.0 | 5/20 | 5.0 |

In this example, Engine A's accuracy increases with complexity level of biometric string, while Engine B's accuracy is independent of complexity of biometric string and Engine C's accuracy decreases strongly with complexity level of biometric string. (Accuracy is a function of the number of positively identifiable users (users with cross-over rate of 0%) out of all users in the test set.). Therefore, for highly complex strings, engine A would receive the highest weight factor fC. For strings of low complexity, engines A and C receive almost the same weights, while engine B receives a lower fC. A useful range of values for this parameter is from about 0.05 to about 20.

Weight Subfactor fTM: Biometric Template Maturity

Template Maturity incorporates the following components: the time elapsed since template creation, the time elapsed since the latest template update, the frequency with which the template has been used, and the frequency with which the template has been updated. This subfactor provides a "memory" function to permit information about the history of a template to be incorporated in confidence measurements. As with the string complexity subfactor, processing engines may be tested in a controlled environment to determine relationships between accuracy and template maturity. A useful range of values for this parameter is from about 0.05 to about 20.

Weight Subfactor fS: Engine Initial Confidence

Engine initial confidence is a measure for the expected performance of an engine type based on its scoring history. An engine that consistently produces high scores for a specific user is assigned a high initial confidence. An engine that often returns low scores for the user often will be given a lower initial confidence value. This subfactor provides another path for information about an engine's historical performance to be fed back and used to improve the system's performance. A useful range of values for this parameter is from about 0.05 to about 20.

In the example described with reference to FIG. 4, the raw biometric data collected is keystroke timing information. However, biometric data from other input devices can be collected and analyzed according to an embodiment of the invention. For example, the prospective user's fingerprint image can be scanned with an optical or capacitive sensor; finger lengths can be measured with an appropriate input device, and/or iris and retinal images can be collected with a camera. These raw biometric datasets may be further processed to create combined or derivative input datasets for processing engines to operate on.

Figure 5:
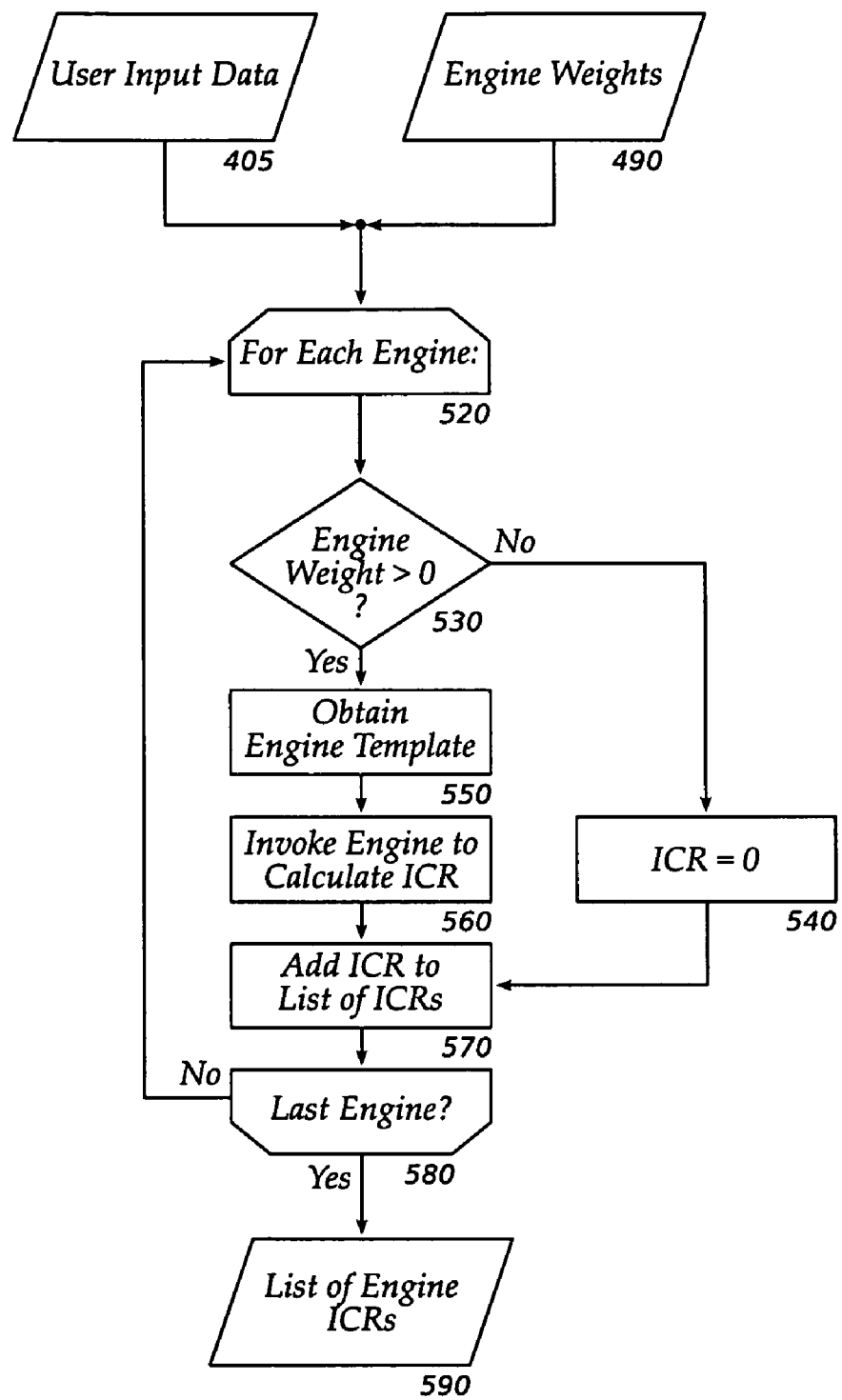
FIG. 5 is a flow chart showing operations of a hybrid authentication processor.

FIG. 5 details operations of the hybrid processor. Biometric data 405 collected by the hybrid preprocessor, and engine weights 490 computed thereby, are received by the hybrid processor. For each engine (520), the processor checks the engine weight to see that it is greater than zero (530). If the weight is zero, the engine's initial confidence result ("ICR") is set to zero (540) and the engine is skipped.

If the weight is greater than zero, template information relevant to that engine is extracted from the user template database (550), and the engine is invoked to prepare an initial confidence result based on the biometric data and the template (560). The initial confidence result prepared by the engine is stored (570), and the hybrid processor continues to invoke (or skip) the next engine (580). At the end of this phase of operations, an initial confidence result has been obtained from each individual processing engine (590).

Individual engines may operate on only a single type of biometric data, or on a dataset containing several different types of data. Two or more engines may operate on the same dataset, applying different algorithms to compute different confidence results.

Figure 6:
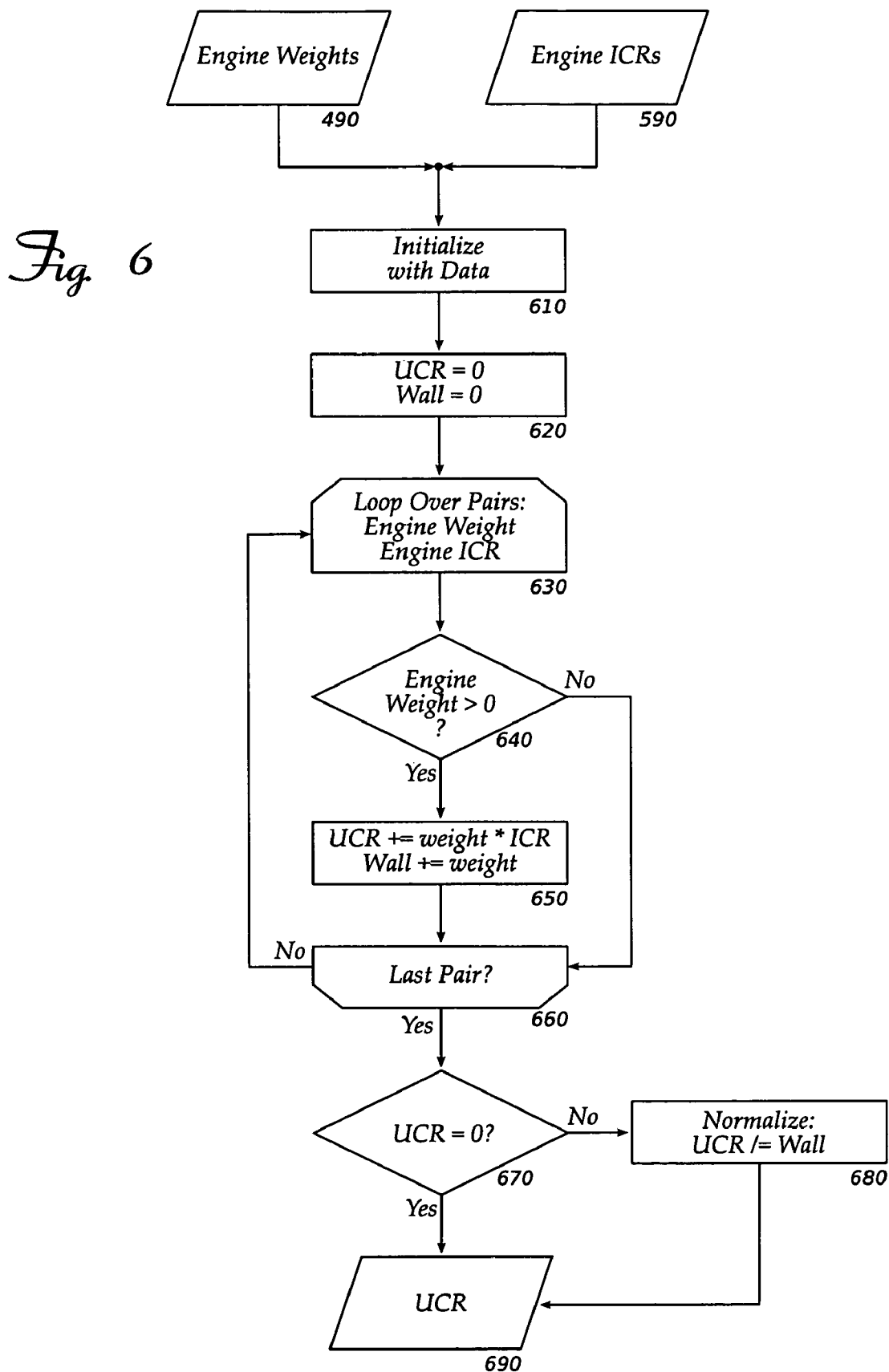
FIG. 6 is a flow chart showing operations of a hybrid-unified score calculator.

FIG. 6 shows how the unified score calculator can prepare a final authentication result. The engine weights (490) prepared by the hybrid preprocessor and the initial confidence results (590) collected by the hybrid processor are used as input. The calculator initializes its state (610) and clears the final unified confidence result ("UCR") and weight running sum ("$W_{all}$"), then loops over engine weight-ICR pairs (630). For each pair, if the engine weight is greater than zero (640), the product of the weight and the ICR is added to UCR, and the weight alone is added to $W_{all}$ (650). If the engine weight is zero, the loop continues to the next iteration (660) without changing UCR or $W_{all}$. After all weight-ICR pairs have been processed, if the UCR is non-zero (670), it is scaled by dividing it by the sum of weights $W_{all}$ (680). This gives the scaled unified confidence result UCR 690.

The ICR weighting process described above can alter the relative importance of ICRs from various engines, even if the engines operate on the same input dataset or give the same result. Engine subfactors may be adjusted to improve the performance of an individual engine, while the engine weight parameter permits the engine's contribution to the overall UCR to be limited until confidence in the engine's performance is gained. The two-level, weight subfactor/weight factor system described with reference to FIGS. 4-6 can provide additional control and flexibility in a hybrid comparison system.

In a typical system, the host application would compare the unified confidence result with a threshold value to determine whether the prospective user has adequately established his identity to the system. The threshold value can be adjusted lower, to reduce the incidence of incorrect rejections of authorized users, or higher, to reduce the chances that an impostor will be able to impersonate a real user.

An embodiment may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

In a software-based embodiment, the multiple processing engines can be implemented as loadable modules or "plug-ins." A plug-in might provide a new or upgraded algorithm to analyze biometric data of a user and produce an initial confidence result based on some feature or characteristic of the data. For example, in addition to the statistical and neural-network engines discussed above, a new module to perform a Hidden Markov Model analysis of the biometric data could be added. A core "driver" program may be provided to collect the raw biometric data, invoke some or all the plug-in processing engines found in a configuration input file, directory or storage location, and prepare the unified confidence result from the collected initial confidence results of the processing engines. Thus, the overall operation of the multi-model hybrid comparison system may be adjusted for desired results in a particular environment by installing and/or enabling a set of processing engines that work well on the available biometric data.

A machine-readable medium may include any mechanism for storing or transmitting information in a form readable by a machine (e.g., a computer), including but not limited to Compact Disc Read-Only Memory (CD-ROMs), Digital Versatile Disks (DVD), Universal Media Disc (UMD), High Definition Digital Versatile Disks (HD-DVD), "Blu-ray" Digital Versatile Disks (Blue-ray DVD), Hologram storage, hard drive, Read-Only Memory (ROMs), Volatile and Non-Volatile Random Access Memory (RAM), and Erasable Programmable Read-Only Memory (EPROM).

Embodiments have been described largely by reference to specific examples and in terms of particular allocations of functionality to certain hardware and/or software components. However, those of skill in the art will recognize that user authentication based on multiple weighted identification results can also be performed by software and hardware that distribute the functions of embodiments of this invention differently than herein described. Such variations and implementations are understood to be apprehended according to the following claims.

We claim:

1. A method comprising:
   collecting a plurality of one type of biometric measurements of a user;
   computing a first confidence measure from the biometric measurements according to a first algorithm and a second confidence measure from the biometric measurements according to a second algorithm,
   wherein the first confidence measure is based on at least two of: a) string complexity based on a length of the string, repeated letters of the string, and repeated sequences of letters of the string, b) biometric template maturity based on a time elapsed since template creation, a time elapsed since the latest template update, a frequency with which the template has been used, and a frequency with which the template has been updated, and c) engine initial confidence based on an authentication scoring history of the user; and
   wherein the second confidence measure is based on at least two of: a) string complexity based on a length of the string, repeated letters of the string, and repeated sequences of letters of the string, b) biometric template maturity based on a time elapsed since template creation, a time elapsed since the latest template update, a frequency with which the template has been used, and a frequency with which the template has been updated, and c) engine initial confidence based on an authentication scoring history of the user; and
   preparing a unified confidence measure from weighed inputs including the first confidence measure and the second confidence measure.

2. The method of claim 1 wherein the plurality of biometric measurements includes a plurality of keystroke timings of the user typing a string.

3. The method of claim 2 wherein a weight associated with the first confidence measure incorporates at least one of a complexity measure of the string and the user's familiarity measure of the string.

4. The method of claim 2 wherein the string is one of a username, a real name, a password, an electronic mail address, or a predetermined phrase.

5. The method of claim 1 wherein the plurality of biometric measurements include at least one of a plurality of lengths of parts of the body of the user, an image of a fingerprint of the user, an image of an iris of the user, an image of a retina of the user, and a digitized recording of a voice of the user.

6. The method of claim 1 wherein the first confidence measure is an output of a neural network configured to classify an input data set, wherein classifying the input data set comprises learning that the user types overlaps successive keystrokes.

7. The method of claim 6 wherein the first confidence measure incorporates a maturity of a template.

8. The method of claim 6, wherein classifying the input data set comprises learning that the user types repeated letters in a distinctive way.

9. The method of claim 1 wherein the second confidence measure is an output of a statistical analysis of an input data set.

10. The method of claim 1 further comprising:
    updating a historical weight based on the first confidence measure, the historical weight to be used to prepare a subsequent confidence measure according to the first algorithm.

11. The method of claim 1, wherein the plurality of one type of biometric measurements are only from a keyboard.

12. A non-transitory computer-readable medium containing instructions to cause a processor to perform operations comprising:
    collecting one type of biometric measurements of a user;
    processing the biometric measurements with a plurality of processing engines, each processing engine to produce an initial confidence result; and
    computing a unified confidence result comprising a weighted sum of the initial confidence results, wherein weights of the weighted sum limit input of each processing engine to the weighted sum until confidence in performance of each processing engine is gained, and wherein confidence of each processing engine is based on an authentication scoring history of the user.

13. The non-transitory computer-readable medium of claim 12, containing additional instructions to cause the processor to perform operations comprising:
    normalizing the unified confidence result.

14. The non-transitory computer-readable medium of claim 12, containing additional instructions to cause the processor to perform operations comprising:
    invoking a plurality of plug-in modules found in a storage location.

15. The non-transitory computer-readable medium of claim 12 wherein a processing engine is to apply an algorithm to the biometric measurements to produce an initial confidence result.

16. The non-transitory computer-readable medium of claim 12 wherein collecting biometric measurements of a user comprises:
    recording a time of a plurality of key press events and key release events, said key press and key release events associated with the user typing at least one of a username, a real name, a password, an electronic mail address, and a predetermined phrase.

17. A system comprising:
    a processor;
    a memory;
    a storage device;

a hybrid pre-processor to collect one type of biometric input data;
a hybrid processor to pass a first dataset derived from the biometric input data to a first processing engine and to pass a second dataset derived from the biometric input data to a second processing engine; and
a hybrid unified score calculator to compute a unified confidence result from a first output of the first processing engine and a second output of the second processing engine,
wherein the first output of the first processing engine comprises a string complexity based on a length of the string, repeated letters of the string, and repeated sequences of letters of the string, and wherein the second output of the second processing engine comprises a string complexity based on a length of the string, repeated letters of the string, and repeated sequences of letters of the string.

18. The system of claim 17 wherein
the first processing engine is to apply a first algorithm to produce the first output based on the first dataset; and
the second processing engine is to apply a second algorithm to produce the second output based on the second dataset.

19. The system of claim 18, wherein the first dataset is identical to the second dataset.

20. The system of claim 18, wherein the first dataset is different from the second dataset.

21. The system of claim 17 wherein
the first processing engine is a statistical engine; and
the second processing engine is a neural network engine.

* * * * *